United States Patent [19]
Gilbert

[11] Patent Number: 5,445,346
[45] Date of Patent: Aug. 29, 1995

[54] AIRCRAFT TAIL SURFACE SPOILERS

[76] Inventor: Raymond D. Gilbert, 6501 Inwood Dr., Springfield, Va. 22150

[21] Appl. No.: 935,284

[22] Filed: Aug. 26, 1992

Related U.S. Application Data

[63] Continuation-in-part of Ser. No. 589,038, Sep. 27, 1990, abandoned.

[51] Int. Cl.6 .............................................. G05D 1/00
[52] U.S. Cl. ................................... 244/197; 244/196; 244/199; 244/221
[58] Field of Search ............... 244/196, 197, 220, 221, 244/223, 225, 232, 233, 198, 13, 35 R, 215, 75 R, 199

[56] References Cited

U.S. PATENT DOCUMENTS

| | | | |
|---|---|---|---|
| 1,773,530 | 8/1930 | Hannah | 244/197 |
| 2,455,584 | 12/1948 | Jamison | 244/197 |
| 2,665,084 | 1/1954 | Feeney et al. | 244/197 |
| 2,740,596 | 4/1956 | Lee | 244/199 |
| 2,846,165 | 8/1958 | Axelson | 244/199 X |
| 3,539,133 | 11/1970 | Robertson | 244/197 |
| 4,019,696 | 4/1977 | Hirt et al. | 244/199 |
| 4,039,161 | 8/1977 | Bauer | 244/199 |
| 4,142,699 | 3/1979 | Arnquist et al. | 244/213 |
| 4,180,224 | 12/1979 | Ryle, Jr. | 244/199 |
| 4,293,110 | 10/1981 | Middleton et al. | 244/199 |
| 4,781,341 | 11/1988 | Kasper | 244/13 |

*Primary Examiner*—Kenneth R. Rice
*Assistant Examiner*—Christopher P. Ellis

[57] ABSTRACT

Spoilers on the forward top and bottom elevator tail surface of large aircraft offer an independent backup for pitch control. The placement of spoilers in a line along the forward portion of an aircraft pitch-control structure offers direct upward or downward "lift" from a spoiler-induced unbalance of Bernoulli forces on a near-symmetrical airfoil. Combined with a temporary bypass valve and channels between the "up" and "down" hydraulic actuators, a spoiler's forward-mounted torsion force on the elevator surfaces can also rotate the elevators in a controlled fashion. Preparation for hi-risk aircraft missions would install gate-spoiler surfaces into spoiler-actuating subsystems as a temporary safety-of-flight hedge against the loss of hydraulic elevator control.

10 Claims, 3 Drawing Sheets

Elevator Spoiler System

Zone Boundary Matrix

Airflow Lines

Zonal Areas / Fuselage = 9
/ Close Flge = 7

Outward Lines / Center = 5
/ Structure = 3

Leading Edge (LE) = A
/ Outboard = 1

44 deg / LE = C 85 deg / LE = E (LE - MT)/2 = G

Max Thickness (MT) = I (MT - TE)/2 = K

Tab Line = M

Trailing Edge = O

| | | | |
|---|---|---|---|
| | D4 | D6 | |
| | F4 | F6 | |
| | H4 | H6 | |
| | J4 | J6 | |
| | | | |
| | | | |

Top Forward Surface = S    Bottom Forward Surface = P
Top Aft Surface = T    Bottom Aft Surface = Q

AIRCRAFT TAIL SURFACE SPOILERS

This is a continuation in part of application Ser. No. 07/589,038 filed Sep. 27, 1990 entitled "Pilot's Manual Over-ride of Powered Elevator", now abandoned.

BACKGROUND OF INVENTION

Aircraft tail structures have grown in surface area and frontal area. Attitude control mechanisms convert directive signals of humans and instruments into powered actuators which partially rotate airfoil surfaces. Powered systems for pitch and yaw control of aircraft harbor potential failure modes.

e.g. Safety-of-flight was brought to National television screens on Jul. 19, 1989, when a United Airline aircraft attempted an emergency landing at Sioux City Iowa, after its powered pitch control system had been damaged during flight. The pilot maintained heroic pitch control with other power and control options, however a fuguoidal nose-down oscillation during final approach induced a crash with loss of life.

Aircraft in flight can tolerate severe damage and survive if the pilot can retain aircraft pitch control, however, failure of powered control surfaces exaggerates pitch-control problems:

Servo-tabs at the trailing edge of elevator surfaces were are linked through handles, cables, pulleys, and lever arms to augment rotational capability of tail surfaces of older A/C.

Those trailing hinge-surface tabs rotated oppositely from intended rotational movement of aft elevator plates to which they are were attached. Air driven forces from the tabs helped actuate the hinged-plate airfoils against air-fluid forces of flight. Paradoxically, the direct force from the servo-tabs was opposite from the pilot-intended tail reaction.

Pilot and autopilot commands to move airfoil control surfaces for modern, very large aircraft pass from the cockpit to tail surface actuators through electric communication, (fly by wire) wherein original commands are reconverted into mechanical action with electromechanical apparatus, frequently including hydraulic systems.

Ref: McGraw Hill Encyclopedia of Technology.

"Flying tail" elevator systems combine horizontal stabilizers of a front portion and hinged aft plates of a rear portion into a "Stabilator" U.S. Pat No. 4,781,341. Airframe-mounted power sources of large aircraft connect and rotate these combined cantilever structures. Some large aircraft designs connect control surface power sources independently to cantilevered horizontal stabilizers and to cantilevered elevators shaped as hinged aft plates.

Growth of aircraft size has drawn special dependence on powered subsystems, and in parallel has introduced a need for alternative backup systems.

Fence spoilers, arising through the top surface of WWII very large fighter aircraft (P-61) replaced ailerons. Flat spoiler surfaces, perpendicular to flying air-loads, were manually lifted above the forward wing airfoil to kill center-of-wing lift in proportion to their extended height and in accordance with Bernoulli lift phenomena.

(e.g.) Pressure+½Density
(Velocity)(Velocity)=Constant.

Hinge spoilers are powered to rotate upwardly from aft wing sections of heavy aircraft to resist air pressure of forward motion, to kill some aft lift during landing and to augment aileron forces during slow flight. (U.S. Pat. No. 3,618,878) Arnquist.

Hinge spoilers are rectangular flat surfaces, rotationally attached to a top surface plane of an airfoil, and usually located along the aft edge of an inboard section of a wing or elevator plate.

SUMMARY OF THE INVENTION

This aircraft (A/C) invention mounts air-barrier spoilers on top and bottom of the symmetrical airfoil surfaces of elevators. Elevator-mounted spoiler actuating apparatus is coupled to spoiler surfaces and to independent communication with pilot. Spoiler elements, located forward of the airfoil center line, rotate barrier surfaces into uniform lift-killing barriers. The safety-of-flight invention provides a sensitive pitch-control backup for aircraft subject to internal or external damage of powered systems.

ADVANTAGES

The inherent lift generating capability of each side of a symmetrical airfoil is made useful with surface spoilers and without the need to rotate the airfoils.

Controllable spoilers, along the forward portion of an airfoil, when activated, kill that surface's Bernoulli lift and simultaneously release opposite-side lift as an unbalanced force suitable for sensitive aircraft pitch control.

Spoiler mechanisms can be designed as temporary structural features which can be attached to aircraft tail surfaces as a temporary field-change to enhance survivability.

Spoiler mechanisms can be added to new airfoil surfaces and linked to control systems for Safety-of-flight improvement.

Human-level actuating forces can control pitch of very large aircraft as a backup to normal automated power systems.

Spoiler actuation to eliminate lift on the top surface of the elevator kills much of the Bernoulli-effect lift on the top surface of the elevator so that the lower symmetrical, but undisturbed Bernoulli lift will draw the tail downward and increase the aircraft's nose up attitude.

Oppositely, a spoiler, actuated on the bottom surface of an elevator releases lifting forces of the top surface to draw the tail upward and increase the aircraft's nose-down attitude.

DESCRIPTION OF THE PREFERRED EMBODIMENTS

An elevator spoiler system (FIG. 1) combines an arrangement of spoiler apparatus (FIGS. 1M, 1N, 4G, 5B 6C & 7H) onto the top and bottom airfoil surfaces of an aircraft elevator (FIG. 1L), including both left and right elevator structures. (FIGS. 7G & T).

Figure 1:
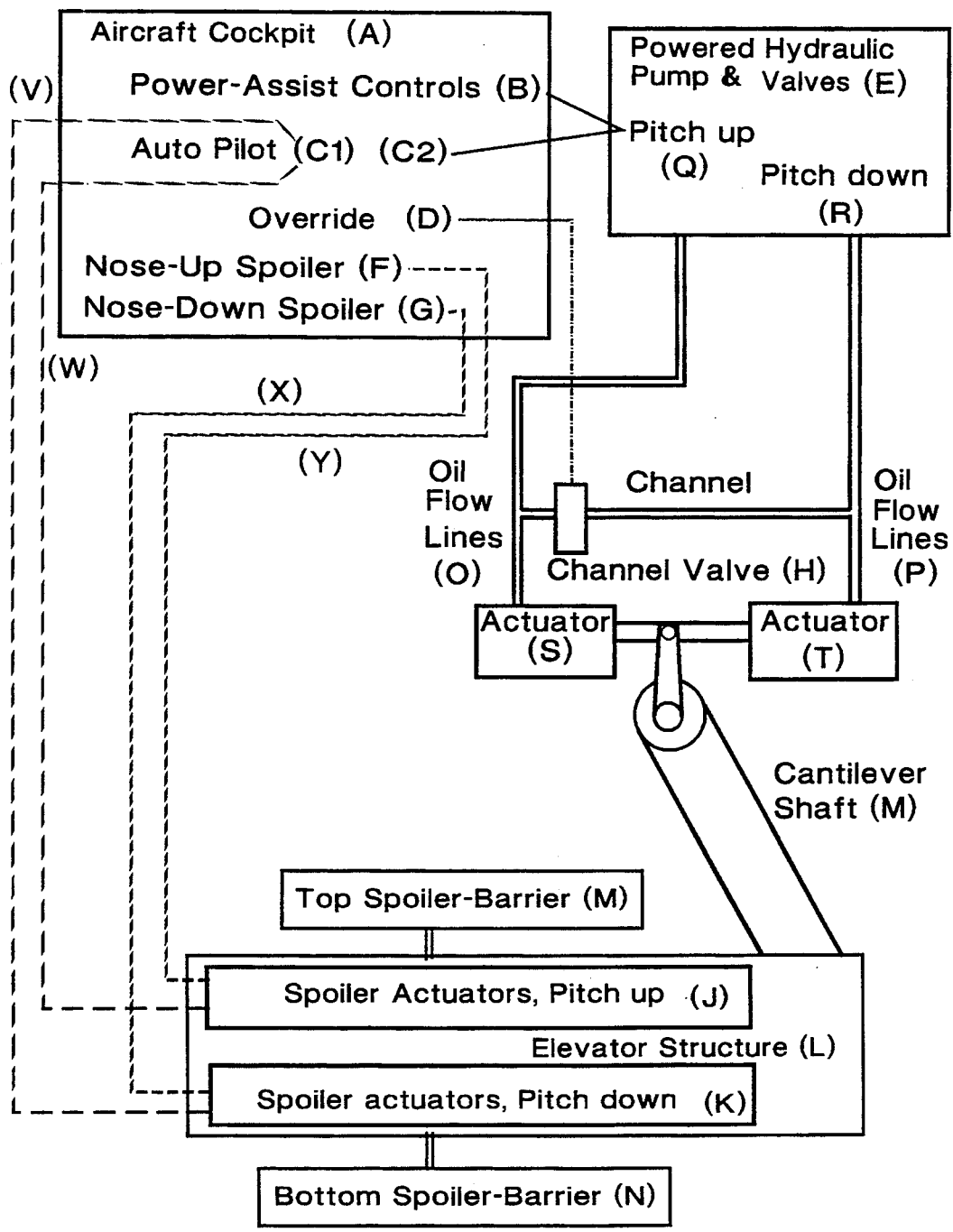
FIG. 1 is a diagram of an elevator spoiler system.
Figures 2, 3:
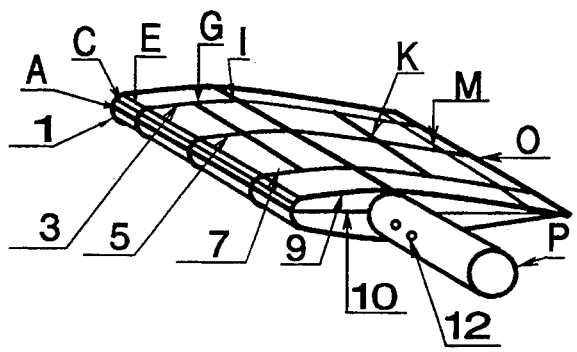
FIG. 2 is a sketch of elevator airfoil surface lines, applicable to top and bottom of left and right elevator.
FIG. 3 is a chart of zone boundary matrix, defining the areas surrounded by lines of FIG. 2.
Figure 4:
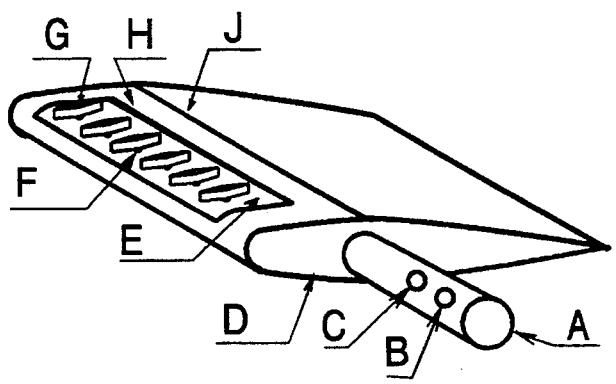
FIG. 4 is a sketch of a line of gate spoilers on the forward top surface of an elevator airfoil.

Spoiler-barriers (FIGS. 1M, 1N & 4G) are located in surface zonal areas (FIG. 3) bounded by aft lines parallel to center of rotation of airfoil surfaces (FIGS. 2I & 4J); by fore lines parallel to leading edge (FIG. 2A); by inner airflow line (FIG. 2.7) and by an outer airflow line (FIG. 2.3). Spoilers are in a line (FIGS. 4E & 7H) that is normal to airflow over top and bottom of the elevator surface.

Spoilers of the rectangular gate type (FIG. 5B) are thin, sharp edged, near-rectangular surface areas standing normal to the elevator surface area (FIG. 4E) and supported from a center shaft (FIGS. 5A–E) that extends downward through the top or bottom surface of elevator into an actuator apparatus.

Figure 5:
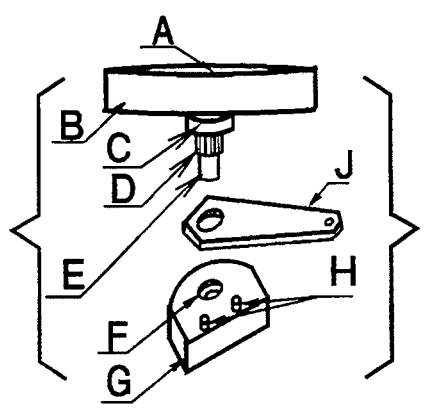
FIG. 5 is an exploded view of Gate Spoiler parts.
Figure 6:
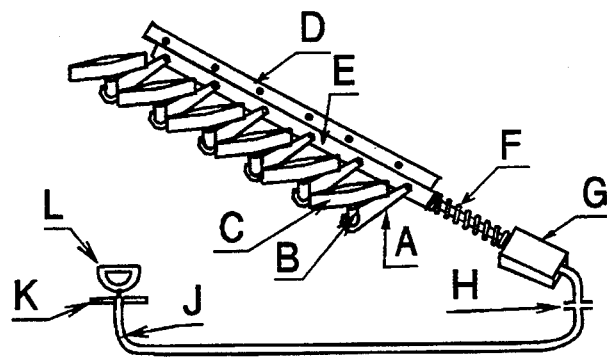
FIG. 6 is a line of gate-spoilers with sub-surface actuator apparatus and mechanical communication to a spring-biased handle.
Figure 7:
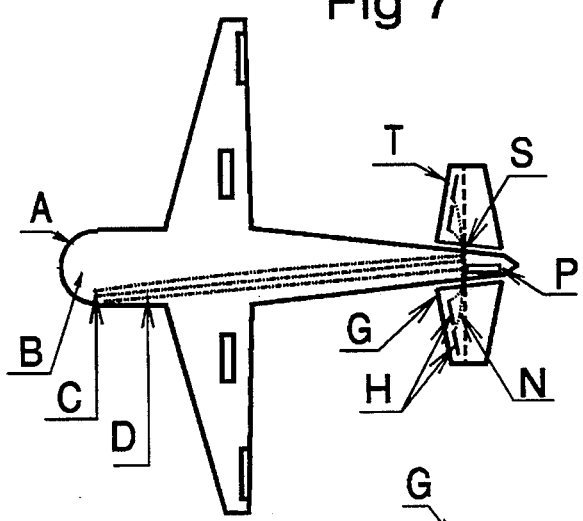
FIG. 7 is a sketch of an aircraft with independent communication lines from aircraft cockpit through fuselage to tail, with connection to spoilers and bypass valve.

Actuating apparatus (FIGS. 1J & K) for each line of spoilers is connected to the elevator structure (FIGS. 5G & 6D).

Actuating apparatus grasp spoiler gate shafts with lever arm (FIGS. 5I & 6A), collectively attached to a sliding plate (FIG. 6E) which is pulled by cables (FIGS. 6J 1X & 1Y) against spring bias (FIG. 6F) from a handle (FIG. 6L) attached to the floor of the aircraft cockpit.

Manual cockpit handles (FIG. 6L) are cable-connected (FIGS. 6J, 1X & 1Y) to the actuators for top and bottom elevator spoilers (FIGS. 1M & N). One handle actuates spoiler movement for nose-up spoiler, (FIG. 1F) and another handle for nose-down spoiler, (FIG. 1G).

Each cable passes through a spring bias (FIG. 6F) and is connected to a sliding plate (FIG. 6E) which, in turn, is connected to the lever arm for each gate in a spoiler line. Full movement of a spoiler handle rotates all gates of a spoiler line into a continuous "barrier" (FIG. 1M).

A cable bearing (FIG. 6G) for each line of spoilers, (FIG. 6G) is fixed to the elevator structure and guides the cable while holding one spring end (FIG. 6F) in place. The cable system passes through a transition connection (FIGS. 4C & 5E) between the elevator structure and the aircraft fuselage. The cable (FIG. 6J) continues to a connection through the cockpit floor (FIGS. 6K 1A & 7B), and to the pull-handle (FIGS. 6L 1F, 1G & 7C).

A stepper motor (FIG. 5E) is combined with a gate-spoiler bearing (FIGS. 5F & G), and electrically connected (FIGS. 1V & W) to the autopilot (FIG. 1C1).

Electric stepper-motors are on shafts of one or more gate spoiler assemblies (FIGS. 5A–G) having torque arms (FIGS. 5I & 6A) that connect to slider plates and thence to torque arms to unpowered spoiler-gate shafts.

Electric command lines (FIGS. V & W) communicate between autopilot (FIG. C1) output and electric stepper motors (FIG. 5G) within actuator assemblies for lines of gate spoilers on top (FIG. 1M) and bottom (FIG. 1N) elevator surfaces.

In related art, power-assist pilot controls (FIG. 1B) and autopilot (FIG. 1C2) communicate to—valves (FIG. 1E) having "pitch up" (FIG. 1Q) and "pitch down" (FIG. 1R) flow lines (FIGS. 1O & 1P) that directly connect to actuator cylinders (FIGS. 1S & T).

Pressurized fluids flow into actuators to generate mechanically-forced movement and rotate a cantilever shaft (FIGS. 1M, 4A & 7S) with its set of elevator surfaces (FIGS. 1L, 7G & 7T).

Figure 8:
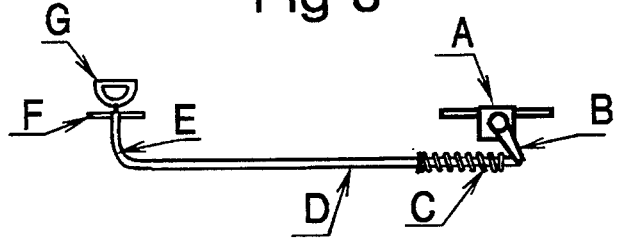
FIG. 8 is a valve, cable and cockpit handle arrangement.

An override handle (FIGS. 1D & 8G) in the cockpit communicates through a cable (FIG. 8D) and load-spring (FIG. 8C) to a normally closed lever (FIG. 8B) of channel valve (FIGS. 1H & 8A) that connects oil flow lines (FIGS. 1O & 1P).

What is claimed is:

1. An apparatus, in combination with an aircraft, comprising
   a fuselage with a cockpit,
   wings on left and right side of said fuselage,
   a left-side tail-elevator and a right side tail elevator having
   forward portions with symmetrical top and bottom airfoils, from leading edge to maximum thickness, and
   rear portions, with tapered airfoils from maximum thickness to an aft edge,
   a cantilever shaft, connecting and supporting the forward portion of left-side and the forward portion of right-side tail elevators,
   a powered elevator actuator system attached rigidly within the aircraft fuselage and rotationally to the forward-surface actuating cantilever shaft, and
   a pitch-changing communication means between the cockpit and each powered elevator tail surface actuator apparatus;
   the combination further comprises:
   a first spoiler device mounted on the top symmetric surface of the forward portion of the left side tail elevator and
   a second spoiler device mounted on the top symmetric surface of the forward portion of the right side tail elevator, and
   a third spoiler device located on the bottom symmetric surface of the forward portion of the left side tail elevator, and
   a fourth spoiler device located on the bottom symmetric surface of the forward portion of the right side tail elevator, and
   a spoiler actuation means for each spoiler device, and an independent communication means between the cockpit and each said spoiler actuator means;
   said spoiler devices comprising a plurality of rotatable spoiler elements;
   wherein independent communication from the aircraft cockpit drives the actuator means to rotate said spoiler elements into contact with each other to form a single-line air barrier that disables laminar airflow and disengages pressure-reduction mechanism of the Bernoulli effect.

2. An apparatus of claim 1 wherein the spoiler devices are positioned in lines extending from inboard toward outboard zones of the horizontal tail surfaces.

3. An apparatus of claim 2, wherein said spoiler devices are in surface areas between a leading edge line and maximum airfoil thickness line, and from a close-to-fuselage line to an outboard structure line of said tail surfaces.

4. An apparatus of claim 3, wherein the lines of spoiler devices are located aft a line which is at 44 degrees from the elevator's leading edge.

5. An apparatus of claim 1 wherein said multiple spoiler elements, are rotated on a bearing, attached to the elevator structure, to form said barrier normal to airflow over said surface.

6. An apparatus of claim 5 wherein said spoiler elements are simultaneously rotated to combine individual surfaces into a continuous barrier line.

7. An apparatus of claim 1 wherein each spoiler element is a gate apparatus, comprising;
- a first and second sided symmetrical airfoil, surrounding
- a vertical shaft, extending downwardly through
- an arm rigidly connected to the shaft, and extending outwardly to bearings of
- a common actuator bar, and into
- an airfoil bearing, firmly mounted along a line on a surface of the tail elevator airfoil.

8. An apparatus of claim 7 wherein the independent communication means between the cockpit and each spoiler actuator further comprises:
- a handle, within reach of a pilot,
- a cable, connected to the handle, and routed with cable-system means through the fuselage to the direct spoiler actuation means for each spoiler device, wherein the common actuator bar is connected to the independent cockpit communication means and to the arms from each gate spoiler element.

9. An apparatus of claim 7 wherein the direct spoiler actuation means further comprises;
- an electric motor, mounted beneath the elevator airfoil surfaces and coupled coaxially with the gate shaft at airfoil bearing locations, and electrical connections between cockpit-located switches and the spoiler actuation means for each spoiler element device.

10. An apparatus of claim 9, wherein the independent communication means between the cockpit and each spoiler actuator further comprises:
- electric circuits, controlled within the cockpit.

* * * * *